United States Patent
Hamann, Jr.

[11] Patent Number: 5,611,369
[45] Date of Patent: Mar. 18, 1997

[54] CONCRETE HYDRATION SYSTEM

[76] Inventor: Reynold R. Hamann, Jr., 61 Holliston Ave., Portsmouth, R.I. 02871

[21] Appl. No.: 380,494

[22] Filed: Jan. 30, 1995

[51] Int. Cl.$^6$ ............................. C04B 41/00; B05D 1/28
[52] U.S. Cl. .................. 137/561 A; 34/95; 47/9; 264/79; 264/344; 404/75
[58] Field of Search .............. 137/561 R, 561 A; 34/95, 329, 416; 47/9; 264/79, 82, 344, 345; 404/75, 77

[56] References Cited

U.S. PATENT DOCUMENTS

| | | | |
|---|---|---|---|
| 1,694,588 | 12/1928 | Finley et al. | 264/79 |
| 1,954,554 | 4/1934 | Angier | 52/3 |
| 1,999,152 | 4/1935 | Finley | 264/79 |
| 2,003,988 | 6/1935 | Angier | 264/79 |
| 2,021,513 | 11/1935 | Levine | 264/79 |
| 2,046,867 | 7/1936 | Billner | 264/101 |
| 2,532,918 | 12/1950 | Hungerford, Jr. | 137/561 A |
| 3,302,323 | 2/1967 | Popa | 47/9 |
| 3,361,359 | 1/1968 | Chapin | 47/9 X |
| 3,642,969 | 2/1972 | Estrada | 264/82 |
| 3,757,469 | 9/1973 | Smith et al. | 47/48.5 |
| 4,117,685 | 10/1978 | Skaife | 405/36 |
| 4,423,694 | 1/1984 | Senneville | 264/79 X |
| 5,104,594 | 4/1992 | Hillemeier | 34/95 X |
| 5,187,882 | 2/1993 | Leach | 34/389 |
| 5,301,633 | 4/1994 | Lloyd | 119/6.7 |

OTHER PUBLICATIONS

Standard Practice For Curing Concrete, American Concrete Institute, May 1992 ACI 308–92.

*Primary Examiner*—John Rivell
*Attorney, Agent, or Firm*—John A. Haug

[57] ABSTRACT

A hydration system having one or more units (10, 10', 10") for providing a continuous flow of water to newly placed concrete has a plurality of spaced elongated soaker tubes (12) extending parallel to a longitudinal axis (14) of the unit. Respective manifold tubes (16–19) are attached to each end of soaker tubes (12) and a supply coupler (32) is in turn attached to the manifold tubes at one end of the unit and an additional coupler (34) is attached to the manifold tubes at the opposite end of the unit. An upper impervious layer (28) is disposed over the tubes (12, 16–19) and a lower pervious layer (28) is disposed under the tubes (12, 16–19). Layers (26, 28) are attached to each other along the outer periphery of the unit and on opposite sides of the tubes by rivets (30) or stitching (42). A skirt (36) provided with spaced grommets (38) in one embodiment and hook and loop material (40) in another embodiment is disposed along the outer periphery of the unit to facilitate attachment to contiguous hydration units.

19 Claims, 2 Drawing Sheets

CONCRETE HYDRATION SYSTEM

BACKGROUND OF THE INVENTION

This invention relates generally to concrete and more specifically to apparatus particularly adapted to promote optimal curing or hydration of concrete during its early stages.

It is well known that in order to develop desirable properties of strength and durability concrete must be properly cured during its early stages, particularly the first few days, by maintaining a satisfactory moisture content at a suitable temperature. In order to ensure such moisture content it is conventional to either apply water and/or prevent excessive evaporation. With regard to the application of water the American Concrete Institute in their Standard Practice For Curing Concrete (ACI 308-92) lists a number of different systems which can be used to maintain satisfactory moisture including ponding, sprays, steam, or saturated cover materials such as burlap or cotton mats, rugs, earth, sand, sawdust, and straw or hay. It is stated that the system chosen must provide a complete and continuous cover of water. With regard to preventing evaporation it is noted that materials such as sheets of reinforced paper or plastic or membrane-forming curing compounds can be used.

The system chosen for a particular job is dependent on various factors such as availability and cost of water, labor, and curing materials, however, for proper development of desired properties it is important that moisture conditions be continuously maintained.

The above noted conventional systems have various limitations and disadvantages associated with them. For example, ponding can be very effective however it is impractical for many applications and subject to damage from premature or sudden release of the ponded water and, as a result, this system is not very widly used. Fog spraying can be effective at appropriate temperatures but requires a relatively costly set-up. Lawn sprinklers result in water run-off and can be objectionable in locations where the cost of water is high. Earth curing is generally limited to small jobs and requires labor intensive application and clean up. Straw and hay are subject to dislocation by wind unless held down by some means and also require intermittent wetting to prevent drying out. Absorbent materials will hold water on the surface of concrete but also must be wetted intermittently to prevent drying out.

All of the above methods can be effective if used properly. One of the most common methods currently in use is covering the concrete surface with burlap and wetting the surface on an intermittent basis to prevent the burlap from drying out. In recent times, as labor has become a more significant percentage of the total cost of construction, this method has become more and more expensive due to labor costs. For example, since the period for maintaining an acceptable level of moisture is generally considered to be seven days, a contractor must pay workers over time premiums to come to the construction site throughout the week end as well as nights to wet down the burlap every six or eight hours.

SUMMARY OF THE INVENTION

It is an object of the present invention to overcome the above noted limitations of the prior art. Another object is the provision of apparatus particularly useful for curing concrete which minimizes labor costs in setting up and maintaining the proper moisture level during the curing stage of concrete. Another object of the invention is the provision of a concrete curing system which is inexpensive, reliable, reusable and long lasting.

Briefly, in accordance with the invention, a concrete hydration system comprises one or more units each having a plurality of spaced soaker tubes extending parallel to a longitudinal axis connected to a manifold tube at each respective opposite end and with an upper layer of flexible impervious material disposed over the tubes and a lower layer of flexible pervious material disposed under the tubes. The upper and lower layers are connected to one another, preferably at selected locations on either side of each of the tubes, by suitable means such as rivets, stitched seams or the like. Preferably, each of the manifold tubes is provided with a coupling conduit which is adapted for connection with a water source, a coupling conduit of an adjacent system or a closure means. According to a feature of the invention fastening means, such as conventional hook and loop material, grommets, or the like may be provided along the outer periphery of the units to facilitate sealing engagement with contiguous units to cover a site larger than a single unit.

Further details of the invention and advantages thereof will become more apparent from the following detailed description of preferred embodiments of the invention when read in conjunction with the drawings and appended claims.

DETAILED DESCRIPTION OF PREFERRED EMBODIMENTS

Figure 1:
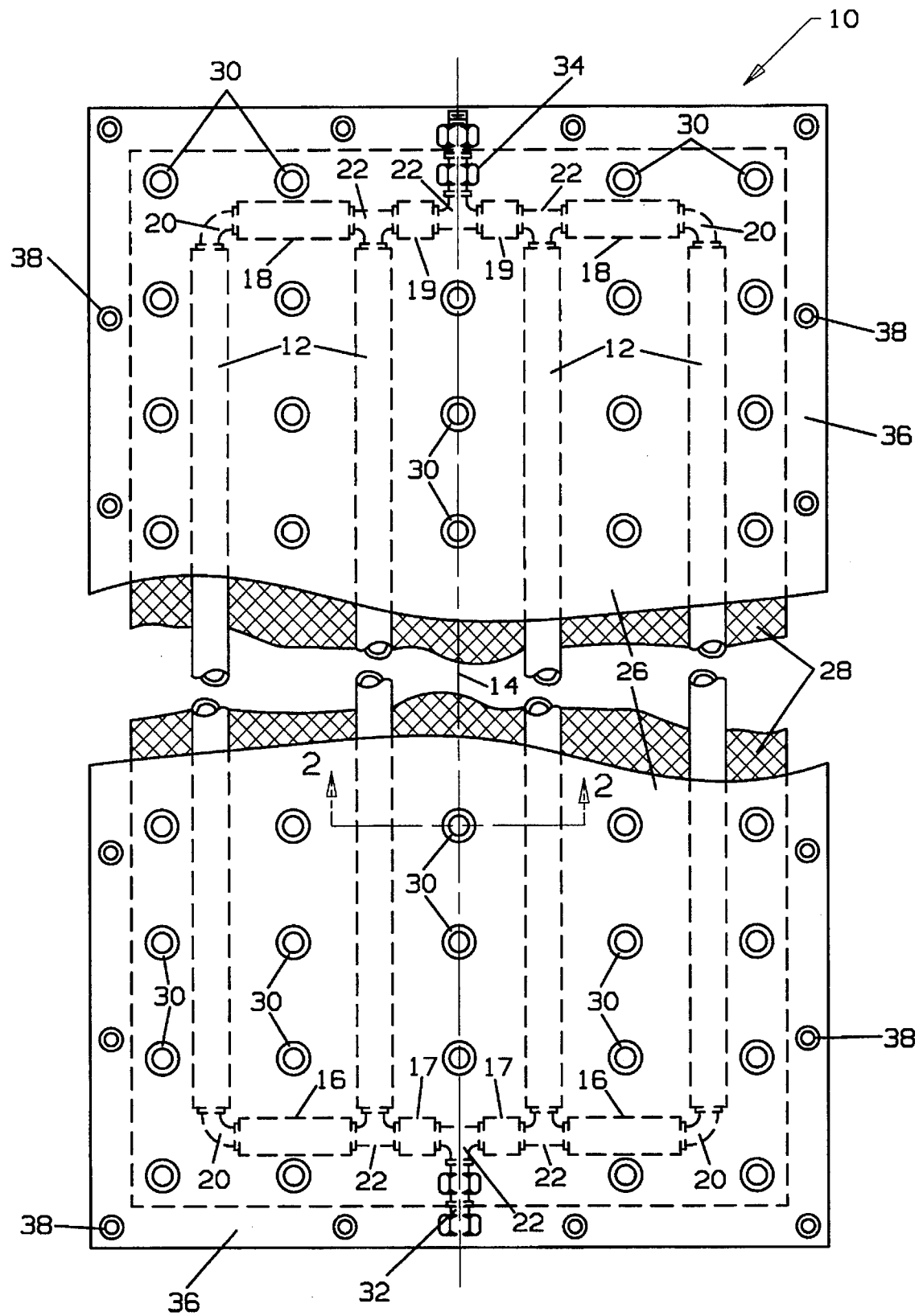
FIG. 1 is a top plan view, partly broken away, of a concrete hydration unit made in accordance with the invention.
Figure 2:
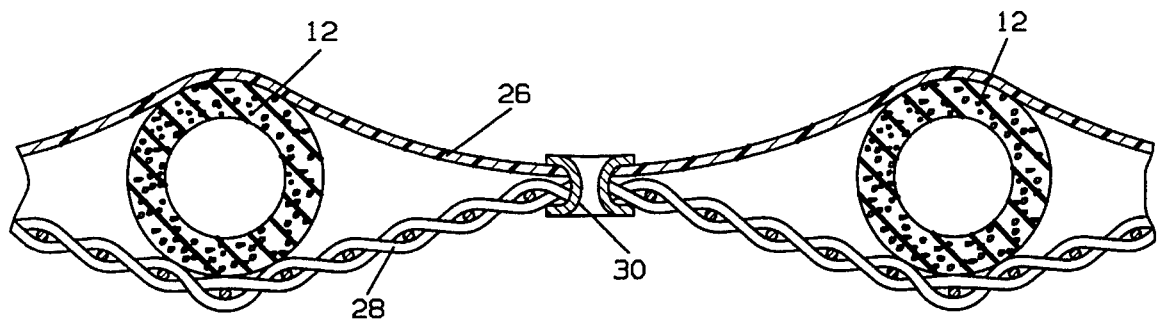
FIG. 2 is a cross-sectional view taken on line 2—2 of FIG. 1.

A concrete hydration unit 10 made in accordance with the invention comprises a plurality of elongated soaker tubes 12 extending generally parallel with one another and with a longitudinal axis 14 and spaced from one another a selected distance. Soaker tubes 12 are formed of pervious polymeric material commonly used for gardening purposes. A tube having an outer diameter of approximately ¾ inch and an inner diameter of approximately 5/16 inch, by way of example, is suitable. Tubes 12 are coupled, at opposite ends to respective manifold tubes 16, 17 and 18, 19 through suitable coupling members including elbows 20 and tees 22. Tubes 16–19 preferably extend generally perpendicular to longitudinal axis 14 and preferably are formed of pervious material of the same type as that of tubes 12.

An upper layer 26 of impervious material is disposed over tubes 12, 16–19 which serves to prevent evaporation of water and may be composed of any durable, flexible material, such as vinyl. Preferably, layer 26 is composed of material which blocks ultra violet light to prolong the useful life of the system by avoiding ageing of the system's components caused by exposure to ultra violet radiation.

A lower layer 28 of pervious material disposed beneath tubes 12, 16–19 allows penetration of water seeping from the soaker tubes through layer 28 to the concrete surface therebeneath. A mesh material of polymer having openings forms a suitable pervious layer.

Figure 4:
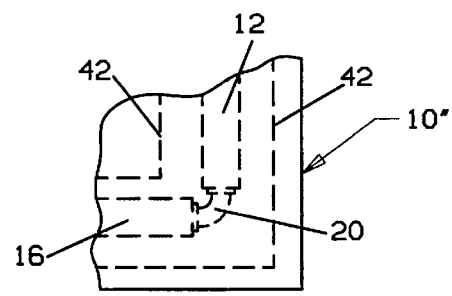
FIG. 4 is a broken away plan view of another modified embodiment.

Upper and lower layers 26, 28 are attached to one another by suitable means, such as by spaced rivets 30 disposed along the outer periphery of the system as well as on opposite sides of tubes 12, 16–19 to maintain the tubes in position within the system. It will be appreciated that, if desired, other attachment means, such as stitching 42 of system 10" shown in FIG. 4, could be employed.

Figure 3:
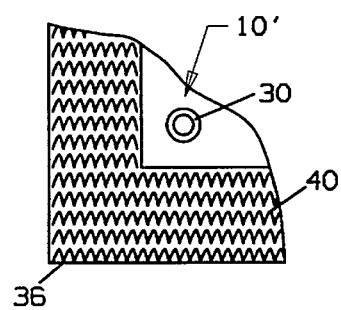
FIG. 3 is a broken away plan view of a modified embodiment.

A suitable supply coupler 32 such as a female quick coupler with a check valve is connected to manifold tubes 16, 17 through tee 22 for connection with a water source while preventing flow out of the unit. A similar coupler 34 such as a male quick coupler and check valve is preferably connected to manifold tubes 18, 19 through a tee 22 for connection with another unit while preventing flow out of the unit when the unit is used by itself or when it is the last of a chain of units. Unit 10 is preferably provided with a skirt 36 formed around its outer periphery by extending upper layer 26 a sufficient distance so that the skirt of one unit can form a seal with the skirt of a contiguous unit as by overlapping one another so that contiguous units can be sealingly attached to one another to cover an area larger than a single unit and avoid undesirable evaporation between such units. Preferably, attachment means such as a plurality of spaced grommets 38 are provided in the skirt so that a positive connection can be made between contiguous units, e.g., by tying together. Alternatively, as seen in FIG. 3, skirt 36 can be provided with a strip of hook and loop material 40, such as Velcro material on the top and bottom sides of unit 10" to effect attachment between units.

In use, unit 10 is placed over a concrete surface to be cured and supply coupler 32 is connected to a suitable water source through a conventional water hose or the like. The check valve of coupler 34 remains closed if unit 10 is sufficiently large to cover the site to be cured, or is automatically opened if it is attached to another unit if more than one unit is required to cover the site. Water applied to the soaker tubes will seep through the walls of the tubes and penetrate through pervious layer 28 onto the concrete surface thereby maintaining moisture in the concrete for as long as the water source is connected yet without having excessive run-off. Soaker tubes 12 are spaced from one another a distance selected to ensure that the entire concrete surface located below the system is maintained in a wet condition and to evenly distribute the water throughout the system. Spacing of approximately two feet between centers of tubes 12 has been found to be suitable using the 5/16 inch inner diameter referenced above for the tubes. In this example a sealing skirt 36 of approximately six inches provides suitable wetting coverage between contiguous units. The particular size of unit 10 is a matter of choice and can be conveniently provided in several standard sizes, such as ten by fifty feet, ten by twenty five feet or the like. Sizes are preferably chosen so that, when not in use, the units can be rolled up and still be easily handled, transported and stored.

It will be seen that by using a concrete hydration system made in accordance with the invention moisture can be maintained for newly placed concrete without requiring workers to come every six or eight hours to wet down the area or even to check that the concrete is being continuously wetted. By means of the invention, a contractor will be able to place the concrete, put the hydration system in place and then continue to perform additional work there or at another site.

Although preferred embodiments of the invention have been described in detail, numerous changes and modifications can be made within the purview of the invention. For example, conduits can be attached to the outermost soaker tubes 12, if desired, to facilitate coupling to laterally placed additional units. Further, various ancillary components can be used with hydration systems made in accordance with the invention such as an alarm system attached to the water supply so that in the event of an interruption in water supply suitable notice will be provided. Temperature control means can be provided to ensure that the temperature of the water is maintained within a desired range relative to the concrete. When used in colder temperature conditions additional insulation layers can be disposed on top of and attached to layer 26 to help maintain the temperature of the concrete above a minimum level. It is the intent that the invention be limited in scope only by the appended claims.

What is claimed:

1. A unit particularly adapted for use in hydrating concrete comprising a plurality of spaced, pervious soaker tubes extending parallel to a longitudinal axis from a first end to a second end, a manifold tube extending generally perpendicular to the longitudinal axis disposed at each of the first and second ends and being in fluid receiving communication with each of the plurality of soaker tubes, a water supply coupling means attached to the manifold tubes at one of the first and second ends, an upper layer of impervious material disposed over the soaker tubes and manifold tubes and a lower layer of pervious material disposed under the soaker tubes and the manifold tubes, the upper and lower layers being attached to one another capturing the soaker tubes and manifold tubes therebetween.

2. A unit according to claim 1 in which the manifold tubes are formed of pervious material.

3. A unit according to claim 1 in which coupling means is attached to the manifold tubes at the other of the first and second ends.

4. A unit according to claim 1 further including a skirt disposed around the outer periphery of the unit, the skirt having attachment means for attaching the unit to another contiguous unit.

5. A unit according to claim 4 in which the attachment means comprises a plurality of spaced grommets.

6. A unit according to claim 4 in which the attachment means comprises hook and loop material.

7. A unit according to claim 1 further including a strip of hook and loop material attached to the unit around the outer periphery of the unit.

8. A unit according to claim 7 in which the hook and loop material is on both upper and lower surfaces of the unit.

9. A unit according to claim 1 in which the upper and lower layers are attached to one another at a plurality of locations on opposite sides of the soaker tubes and the manifold tubes.

10. A unit according to claim 1 in which the impervious layer blocks ultra violet radiation.

11. A unit according to claim 1 in which the upper and lower layers are attached to one another by a plurality of rivets.

12. A unit according to claim 1 in which the upper and lower layers are stitched to one another.

13. A unit particularly adapted for use in hydrating concrete comprising a plurality of spaced, pervious soaker tubes extending parallel to a longitudinal axis from a first end to a second end, a manifold tube disposed at each of the first and second ends and being in fluid receiving communication with each of the plurality of soaker tubes, coupling means attached to each manifold tube, each coupling means having a quick coupler and a check valve, an upper layer of impervious material disposed over the soaker tubes and manifold tubes and a lower layer of pervious material disposed under the soaker tubes and the manifold tubes, the upper and lower layers being attached to one another along the outer periphery of the layers capturing the soaker tubes and manifold tubes therebetweeen.

14. A unit according to claim 13 in which the upper and lower layers are attached to one another by a plurality of rivets.

15. A unit according to claim 13 in which the upper and lower layers are stitched to one another.

16. A unit according to claim 13 further including attachment means to attach the unit to a contiguous unit.

17. A unit according to claim 16 in which the attachment means comprises a skirt of hook and loop material attached to the unit around the outer periphery of the unit.

18. A unit according to claim 17 in which the hook and loop material is on both the upper and lower surfaces of the unit.

19. A unit according to claim 16 in which the attachment means comprises a skirt attached to the unit around the outer periphery of the unit, the skirt having a plurality of spaced grommets.

* * * * *